US008463090B2

(12) United States Patent
Donval et al.

(10) Patent No.: US 8,463,090 B2
(45) Date of Patent: *Jun. 11, 2013

(54) NANOTUBE BASED OPTICAL FUSE DEVICE AND METHOD

(75) Inventors: Ariela Donval, Rosh Haayin (IL); Doron Nevo, Ra'anana (IL); Moshe Oron, Rehovot (IL); Tali Fisher Masliah, Holon (IL)

(73) Assignee: KiloLambda Technologies Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,714

(22) Filed: Jun. 20, 2012

(65) Prior Publication Data

US 2012/0257854 A1 Oct. 11, 2012

Related U.S. Application Data

(63) Continuation-in-part of application No. 13/036,376, filed on Feb. 28, 2011, now Pat. No. 8,233,758.

(60) Provisional application No. 61/312,852, filed on Mar. 11, 2010, provisional application No. 61/502,917, filed on Jun. 30, 2011.

(51) Int. Cl.
*G02B 6/26* (2006.01)
*G02B 27/14* (2006.01)
*A61B 5/05* (2006.01)

(52) U.S. Cl.
USPC ............... 385/16; 385/15; 385/129; 385/130; 385/131; 385/132; 600/424; 359/630

(58) Field of Classification Search
USPC ........ 385/15–16, 129–132; 600/424; 359/630
See application file for complete search history.

(56) References Cited

U.S. PATENT DOCUMENTS

| 3,433,555 | A | 3/1969 | Tomlinson | 350/160 |
|---|---|---|---|---|
| 4,376,632 | A | 3/1983 | Codecasa | 8/125 |
| 5,017,769 | A | 5/1991 | Cohn et al. | 250/216 |
| 5,886,822 | A | 3/1999 | Spitzer | 359/630 |
| 6,204,974 | B1 | 3/2001 | Spitzer | 359/630 |
| 6,218,658 | B1 | 4/2001 | Taneda et al. | 250/216 |
| 6,356,392 | B1 | 3/2002 | Spitzer | 359/630 |
| 6,384,982 | B1 | 5/2002 | Spitzer | 359/630 |
| 7,162,114 | B2 * | 1/2007 | Donval et al. | 385/16 |
| 8,233,758 | B2 * | 7/2012 | Donval et al. | 385/16 |

OTHER PUBLICATIONS

M. Quinten "Local Fields Close to the Surface of Nanoparticles and Aggregates of Naonparticles," Appl. Phys B 73, 245-255, 11 Pages, (2001).
C.F. Bohren and D. R. Huffmann "Absorption and Scattering of Light by Small Particles" Wiley—Interscience, Chapter 12, 56 Pages (1998).
N. B. Blombergen, "Laser Induced Electric Breakdown in Solids," IEEE-JQE, vol. QE-10 No. 3, pp. 375-386, 12 Pages, (1974).

* cited by examiner

*Primary Examiner* — Brian Healy
*Assistant Examiner* — Guy Anderson
(74) *Attorney, Agent, or Firm* — Nixon Peabody LLP

(57) ABSTRACT

An optical fuse or energy-switching-off device includes an optical waveguide having an input section and an output section, the two sections forming a pair of opposed surfaces extending transversely through the axes of the waveguide sections. A substantially transparent material is disposed between the opposed surfaces and comprises an electrically conductive nanotube web immersed in dielectric material, where the nanotubes are not in electrical contact with each other. The substantially transparent material forms a plasma when exposed to optical signals propagating within the optical waveguide with an optical power level above a predetermined threshold, and the plasma damages the opposed surfaces sufficiently to render the surfaces substantially opaque to light propagating within the input section of the optical waveguide so as to prevent the transmission of such light.

15 Claims, 4 Drawing Sheets

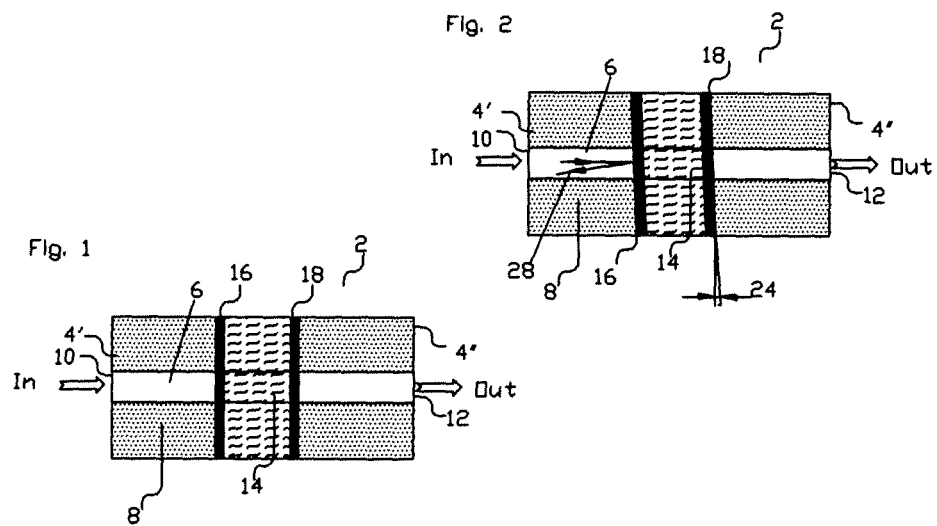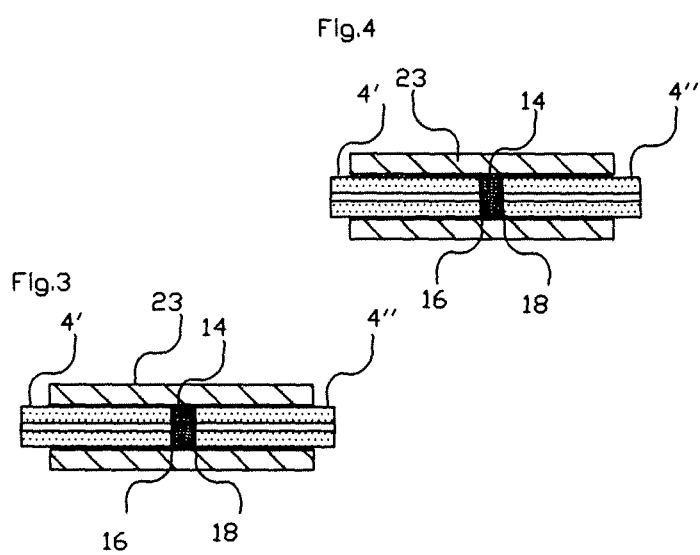

NANOTUBE BASED OPTICAL FUSE DEVICE AND METHOD

CROSS REFERENCE TO RELATED APPLICATIONS

This application is a continuation-in-part of U.S. application Ser. No. 13/036,376, filed Feb. 28, 2011, which claims priority to U.S. Provisional Application No. 61/312,852, filed Mar. 11, 2010 and U.S. Provisional Application No. 61/502,917, filed Jun. 30, 2011, each of which is hereby incorporated by reference herein in its entirety.

FIELD OF THE INVENTION

The present invention relates to an optical fuse or optical power switching-off device and method, and particularly to nanotube or graphene based nanostructure devices and method for interrupting or intensely reducing the optical transmission in response to the transmission of excessive optical power or energy.

BACKGROUND

Fiber lasers, fiber optics for communication systems, and other systems for light delivery, such as in medical, industrial and remote sensing applications, are often handling high powers, namely, optical powers up to several Watts in a single fiber, waveguide or other light delivery channel. When these high specific intensities or power per unit area are introduced into systems, many of the thin film coatings, optical adhesives, detectors and even bulk material, are exposed to light fluxes beyond their damage thresholds and are eventually damaged. Another issue of concern in such high power systems is laser safety, where well-defined upper safety limits are allowed. These two difficulties call for a passive device that will switch off the power propagating in, e.g., a fiber, when the power exceeds the allowed intensity. Such a switching device can be placed either at the input of a sensitive optical device, or at the output of a high power device such as a laser or an optical amplifier, or integrated within an optical system.

In the past, there have been attempts to realize an optical safety shutter, mainly for high power laser radiation and high pulsed power radiation; special efforts were devoted to optical sights and eye safety devices. The properties on which these prior art solutions were based included: (1) self-focusing or self-defocusing, due to a high electric field induced index change through the third order susceptibility term of the optical material, and (2) reducing the optical quality of a gas or a solid transparent insert, positioned at the cross-over spot of a telescope, by creating a plasma in the cross over point to absorb light. These techniques are described in U.S. Pat. Nos. 3,433,555 and No. 5,017,769. In the U.S. Pat. No. 3,433,555, the plasma is created in a gas where the gas density is low (lower than solids and liquids), and the density of the plasma created by the gas is low as well, limiting its absorption to the medium and far infrared part of the light spectrum. This device is not absorbing in the visible and near infrared regions and cannot protect in these regions of the spectrum. U.S. Pat. No. 5,017,769 describes using a solid insert in the cross over point; this transparent insert is covered with carbon particles on its surface, enhancing the creation of the plasma on the surface at lower light intensities, and here the plasma density is high, since it starts from solid material. The dense plasma absorbs visible as well as infrared light, which is an advantage, and the device is equipped with multiple inserts on a (motorized) rotating wheel to expose a new, clean and transparent part after every damaging pulse. The two devices described in U.S. Pat. Nos. 3,433,555 and 5,017,769 are large in their volume, work in free space and require high pulsed powers and thus are less applicable to continuous lasers, to high repetition rate sources or to optical communication devices where powers are lower and fiber or waveguide (in line) devices are preferred.

Passive devices were proposed in the past for image display systems. These devices generally contained a mirror that is temporarily or permanently damaged by a high power laser beam impinging on it, damaging the mirror by distortion or evaporation. Examples of such devices are described in U.S. Pat. Nos. 6,384,982, 6,356,392, 6,204,974 and 5,886,822. The powers needed in these devices are in the range of pulsed or very energetic CW laser weapons and not in the power ranges for communication or medical devices. The distortion of a mirror by the energy impinging on it is very slow and depends on the movement of the mirror's large mass as well as the energy needed to cause the move. The process of removal of reflecting coatings from large areas is also slow, since the mirror is not placed in the focus, where power is spatially concentrated. Another passive device was proposed in U.S. Pat. No. 6,218,658, where two adjacent materials were used (the first material was heat absorbing while the second material was heat degradable). When these materials are inserted into the light beam, the first is heated and transfers its heat to the second, which degrades its transparency or reflectivity due to the high temperature. This process is relatively slow, since heat transfer times are slow, and in many cases not sufficiently fast to intercept the beam before damage occurs to objects along the optical line. In addition, the process of temperature-induced degradation does not provide enough opacity to efficiently prevent damage in high-power spikes that are a known phenomenon in laser fiber amplifiers. Another approach, using a nanostructure, made of nanoparticles in flake shape, was used by Donval et al. in U.S. Pat. No. 7,162,114 and Japanese Patent No. 4376632, to create an optical switch for fibres or an optical fuse.

Better, more opaque, faster-reacting and easier-to-manufacture solutions are needed. The present invention provides a solution accordingly.

BRIEF SUMMARY

It is therefore a broad object of the present invention to provide a passive safety switch or optical fuse that switches off the optical power in waveguides or fiber optics used in optical systems, placed either at the input or output port of an optical device or system.

It is a further object of the present invention to provide a safety switch-off or optical fuse for use in a waveguide or optical fiber systems, the fuse having a predetermined optical power transmission threshold.

It is a still a further object of the present invention to provide a safety switch-off or optical fuse for use in a waveguide or optical fiber, the fuse being activated, namely decreasing drastically the output light level, by a broad range of wavelengths.

It is a still further object of the present invention to provide a safety switch-off or optical fuse for use in an optical system having an input port and an output port and an air space in between, where the optical fuse is placed.

In accordance with one embodiment, there is therefore provided an optical power switching device or optical fuse comprising a waveguide having an input end and an output end, and means responsive to optical power located in the optical path between the input and output ends, for causing the interruption of optical power propagation from the input end to the output end when the optical power exceeds a predetermined threshold. Interposed between two portions of the waveguide and transversing the propagation path of optical power from the input end to the output end, there is affixed a very thin, few tens of nanometers, electrically conductive nano-tube or graphene web where the electrically conducting nanotubes or graphene are not in electrical contact with each other and compose an interrupted conducting layer. The layer may be immersed in transparent dielectric material like glass or a polymer. The layer may be either a layer of only a nano-tube web or a layer that is covered on one or on both sides with transparent dielectric material like glass or polymer layers having anti-reflective coatings on them, reducing the optical reflections. This nano-tube web layer serves to enhance the electric field strength on the surfaces of the thin tips of the nanotubes. Such thin tips of conducting material, such as carbon or metallic nanotubes, or graphene, are known to enhance the electric field strength in their neighborhood due to local gradients near the nano-tips, causing field concentration, resulting in lower power needed to create an electrical breakdown, and damage. See, for example, the paper M. Quinten "Local Fields Close to the Surface of Nanoparticles and Aggregates of Nanoparticles," Appl. Phys. B 73, 245-255 (2001) and the book "Absorption and Scattering of Light by Small Particles" by C. F. Bohren and D. R. Huffmann, Wiley-Interscience (1998), Chapter 12, showing strong field enhancement factors (up to $10^5$) for few nanometers particles as well as wide extinction spectrum for various materials and shapes. Other additional processes can further enhance the breakdown like non-linear self focusing in fibers and avalanche—see, e.g., N. B. Blombergen, "Laser Induced Electric Breakdown in Solids," IEEE-JQE, vol QE-10 No. 3 (1974), pp. 375-386.

When the thin layer is impinged with optical power exceeding a predetermined threshold, strong electric fields, which can lead to local electrical breakdown, are generated at certain sites ("hot spots") in proximity with the nano-web surface. This leads to a visible light emitting arc-discharge, where plasma is created. The generated plasma greatly increases the absorption of the propagating light, and the energetic discharge creates catastrophic damage at or near the nano-web surfaces. This damage is often seen as cratered regions. Thus, the waveguide becomes permanently highly scattering or, in other words, highly opaque for the propagating light. This significantly reduces the transmitted optical power. The opacity is permanent, and the device acts as a fast switch for interrupting the power propagation, which occurs as fast as the breakdown is created and stays permanently as an interrupting switch due to the damage formation by the energetic breakdown. The visible light emitted by the plasma can be detected by a photo-detector and used as an indication that the light intensity passing through the switch is over its designed threshold.

The nano-tube web may consist of conducting nanotubes, or graphene, e.g., carbon nanotubes (or graphene) dispersed randomly in a dielectric material in a way that there is no electrical contact between adjacent nanotubes, leaving distances of 10 nanometers to few hundred nanometers between nanotubes.

The nano-tube web may consist of conducting nanotubes (or graphene) e.g., carbon nanotubes dispersed in an order, where direction and/or length are the same, in a dielectric material, in a way that there is no electrical contact between adjacent nanotubes, leaving distances of 10 nanometers to a few hundred nanometers between nanotubes.

The switching device or fuse is broadband and can be applied to all light bands used for communication, e.g., at wavelengths of 0.8, 1.3, 1.5 micrometers. The resulting damage, such as the craters, permanently blocks the ill operating channel. Also, the device is very fast. Moreover, the visible light, that may be emitted when the damage occurs, can serve as a monitoring device, indicating that light powers higher than the threshold were impinging on the fuse.

As with most optical fiber components, minimal back reflection is desirable. This may be obtained by a combination of two methods. First, the nanotube web, or graphene, can be deposited at an angle, namely, not perpendicular to the direction of propagation of the light, thus preventing any back reflection from re-entering the waveguide core. This can be performed by either using an angled cleave or by using an angled fiber connector (or ferrule). Second, the coating dielectrics, namely glass or polymer layers are designed to have minimal reflections, e.g., by sandwiching the nanotube web, or graphene layer between two anti-reflective layers.

One of the most important properties of the switch is its insertion (or transmission) loss. A low insertion loss at the operating powers is desirable, in order to avoid power losses. However, the nanotube web layer is generally absorbing and reflecting light. As mentioned above, the reflection can be minimized by a proper design of anti-reflective layers. The absorption of the nanotube web layer, however, is an intrinsic property, which cannot be fully eliminated (it typically absorbs between 5% and 30% of the power). Therefore, the insertion loss at the operating power, is not negligible, and may reach the range of 1 dB and or even higher. As opposed to the desirable low insertion loss at the operating powers (below threshold), the fuse is required to have a high insertion loss (low transmission) at high powers (above the threshold). This is obtained by a significant and permanent damage, which significantly increases the loss (reduces the transmission). Typical values of insertion loss after damage has occurred, reach 10 to 20 dB (namely, 1%-10% transmission).

In order to control the threshold power of the fuse, several methods can be used. A first method is to vary the thickness of the nanotube web, or graphene layer. In general, the threshold power decreases with a thicker layer. However, in this method, the insertion loss at the operating power also changes (the thicker the layer, the higher the loss). Thus, if one wants to keep a low insertion loss at the operating powers, this method is rather limited in range. A second method is to use fibers of different core, or mode field diameters. A commonly used fiber in optical communication systems is the SMF-28 single mode fiber. This fiber has a mode field diameter of approximately 10 micrometers for 1550 nm wavelengths. Other fibers have either smaller or larger diameters. For example, High-Numerical-Aperture (HNA) fibers generally have smaller mode field diameters. Thus, in HNA fibers, the light intensity (power per unit area) is larger than in SMF-28 fibers operating with the same power. Consequently, the power threshold in HNA fiber is lower than that in SMF-28 fibers having the same layers. Since there are several possible HNA fibers, with different mode field diameters, one can control the threshold power using this method. Moreover, the input and output fibers can still be standard SMF-28 fibers. These are efficiently fusion spliced to the HNA fibers or other types of fibers (insertion losses can be around 0.1 dB per splice). Thus, using different types of fibers with the same layers, can lead to switches having different thresholds and nearly the same insertion loss at the operating powers. The same principle can be used for multi mode fibers, having various mode field diameters.

The device can be packaged in several ways. A first way is by using optical fiber connectors. In this configuration, the device is similar (at least when viewed externally) to two pigtailed fibers, which are connected using connectors. Namely, there is an input fiber; two connectors connected using an adapter, and an output fiber. However, the difference between the fuse and the standard connector is that either one or both fibers have additional layers on their matching surfaces. A somewhat simpler configuration uses only ferrules, without the whole connector assembly. Here, instead of two connectors and an adapter, there are two ferrules attached inside an adapter or a mating sleeve, again, in the switching device, one or both fibers inside the ferrules have additional layers on their matching surfaces. In order to minimize reflection losses, angled ferrules or angled connectors are used.

A bare fiber configuration of the fuse is another option; here the additional layers on the matching surface are applied to one or two ends of cleaved bare fibers, perpendicular to the fiber axis or tilted at a few degrees angle from the perpendicular surface, to minimize back reflections into the core. The two bare fibers, having a diameter of e.g. 125 micrometers are inserted into an aligning sleeve or capillary and fixed in their positions. All three methods were experimentally tested at the applicants' laboratory and found to function satisfactory.

The fuse can be used as a stand-alone unit, with connectors on both ends or with splices on both ends. The fuse can be used as an internal part of a system where wave-guides are leading to and from the fuse, where neither connectors nor splices are used.

The work at the applicants' laboratory included simulation of the fuse and optimization of its dimensions and materials. The optimization goals were minimal back reflection, maximal (forward) transmission and maximum opacity after irradiation by optical power higher than the threshold.

The design and execution of the sacrificial layers was carried out according to the simulation. An example of a design is given here, where the layer is made of carbon nanotubes in a web like layer embedded in a transparent dielectric. The electric field at and near the end of each nanotube is enhanced due to its sharp tips, and their longitudinal position in the electric field.

The sacrificial nano-tube web layer was positioned at the interface between two glass plates and tested. The fuses were tested for threshold power, insertion loss, and return loss, added opacity after exposure to threshold and higher powers, timing, endurance and visual (microscopic) inspection before and after damage.

At the instance when the damage occurs, and the output energy drops, visible light is emitted in all directions from the core at the damaged spot. This is mainly due to recombination of ions and electrons in the ionized volume of the core close to the switch coatings where the crater or craters are developed. Visual (microscopic) inspection after the damage, revealed a cratered spot, the craters cover about all the spot size, (where the optical power flows) and are few microns deep.

The tests included time domain experiments, where switches were exposed to short pulses (few nanoseconds to tens of microseconds). The switches reacted in the same way as in the CW case i.e. a large drop in its transparency when impinged by powers over the threshold. Insertion losses about 3 dB were obtained. Some more parameters, such as broad-spectrum operation of the switch, modulated optical powers at the GHz range and more and endurance tests were found satisfactory.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 is a schematic, cross-sectional view of an optical fuse device having an internal nanotube web layer.

FIG. 2 is a schematic cross-section view of an optical power-switching device having an angled internal nanotube web layer.

FIG. 3 is a schematic cross-section view of the way to package the switch in a ferrule assembly having layers perpendicular to the direction of propagation of the light.

FIG. 4 is a schematic cross-section view of the way to package the switch in a ferrule assembly having layers in an angle to the direction of propagation of the light, preventing back reflections into the core.

DETAILED DESCRIPTION

Figure 5:
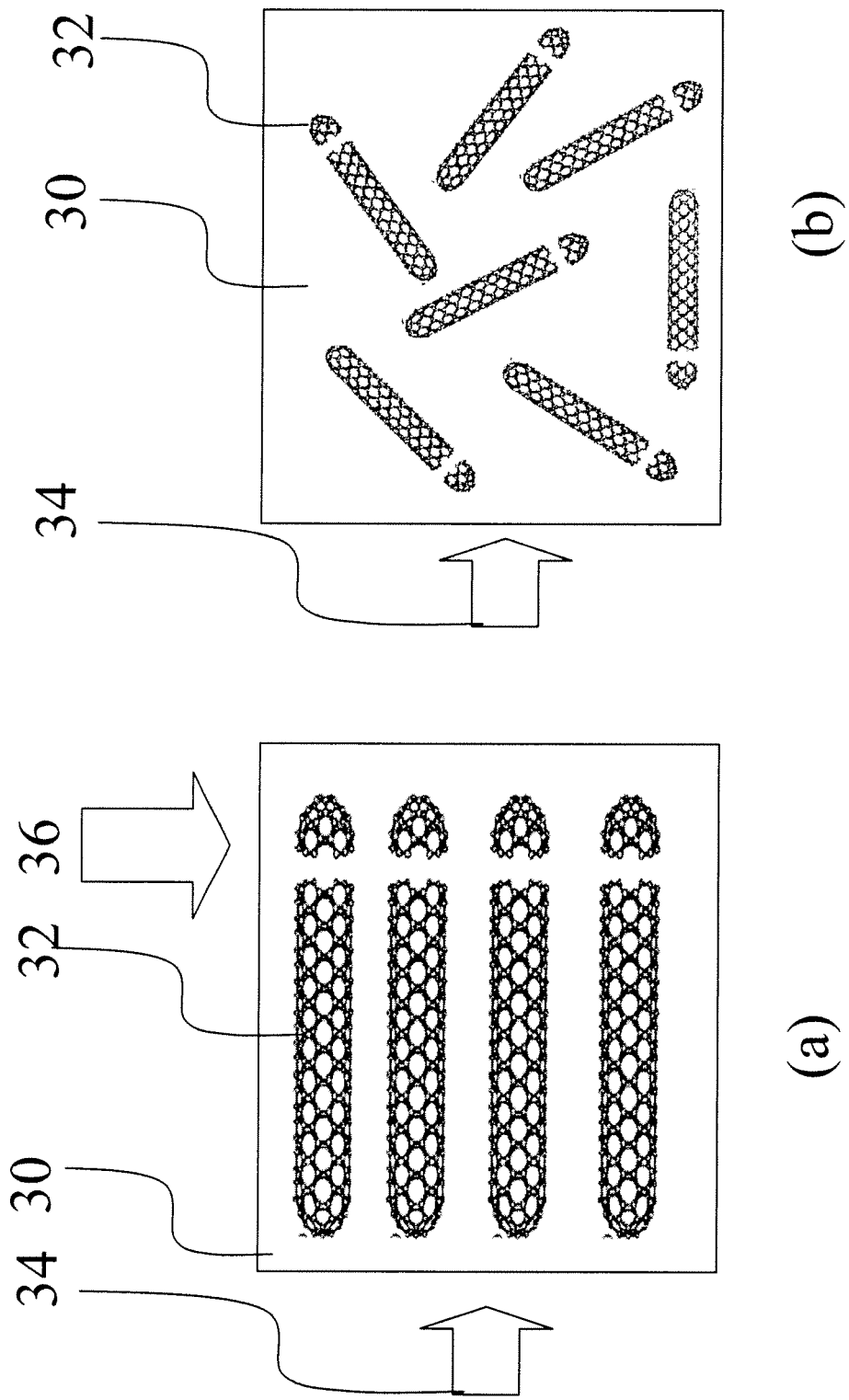
FIG. 5 is a schematic view of the thin layers, nanotube web only or graphene, in different versions.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Referring now to FIG. 1, there is shown an optical power switching device 2, composed of a waveguide 4, e.g., a solid waveguide or a fiber. The waveguide is composed of a central core 6, in which most of the light propagates, and an outer cladding 8. Also, the waveguide has an input end 10 and an output end 12. Interposed between the two portions 4', 4" of waveguide 4 and transversing the propagation path of optical energy from input end 10 to output end 12, there is affixed an optical fuse layer 14. The layer 14 is typically perpendicular to the propagation direction of the light in the waveguide. Layer 14 is very thin (few tens of nanometers) and may be made of a web of a multiplicity of non-touching conducting nanotubes, e.g. carbon nanotubes or nanotubes of conducting metals such as, gold, silver, chromium, nickel or tungsten. The nanotubes or graphene may be randomly dispersed or ordered, in a way that the nanotubes do not touch each other and are not creating a total conducting layer. Layer 14 contains the nanotubes or graphene immersed in a dielectric, e.g. glass or polymer. Also, layer 14 may be covered on one or on both sides with an anti-reflective coating, namely an input anti-reflective coating 16 and/or an output anti-reflective coating 18. These anti-reflective coatings can significantly reduce the optical reflections from layer 14.

FIG. 2 illustrates a similar device as shown in FIG. 1. However, here the layer 14 is not perpendicular to the direction of light propagation in the waveguide, but rather at an angle 24. This angled configuration prevents the back-reflection from the layer, to propagate back inside the optical waveguide. For example, in single mode optical fibers, the angle 24 is typically 8 degrees. Thus, an optical reflection 28 from layer 14 does not propagate backwards inside the waveguide.

FIG. 3 shows a schematic cross-section view of the switch package in a ferrule configuration. Here, the two input and output fibers 4', 4" are matched in ferrule 23 and assembled together to connect the input fiber 4' with the output fiber 4". A optical fuse layer 14, is interposed between the two, and if needed, additional anti-reflective layers 16 and 18, are deposited on one or fibers.

FIG. 4 describes an additional schematic cross-section view of the switch package in a ferrule configuration. Here, two angled fibers 4', 4" are assembled together to connect the input fiber 4' with the output fiber 4", again using a ferrule 23. Here, the optical fuse layer 14 is interposed, and if needed, additional anti-reflective layers 16 and 18, are deposited in an angle on one or both angled fibers. This angled arrangement prevents reflections from entering the core area.

FIG. 5 is a schematic view of the thin layers, nanotube web only versions. FIG. 5a shows an ordered web of conducting nanotubes 32, having diameter of 10-100 nanometers and length of few micrometers, the nanotubes 32 are embedded in a solid dielectric 30 e.g. glass or polymer. Conducting nanotubes 32 are made of e.g. carbon nanotubes or graphene or nanotubes of conducting metals such as, gold, silver, chromium, nickel or tungsten. The order in space and direction is achieved in the growing process of the nanotubes. The distance between tips of adjacent, non-touching nanotubes can be between few tens of nanometers and few hundreds nanometers, in this way determining the threshold power of the optical fuse. The impinging light can come from direction 34 or 36 or perpendicular to them. FIG. 5b shows a random distribution of conducting nanotubes 32, having diameter of 10-100 nanometers and length of few micrometers, the nanotubes 32 are embedded in a solid dielectric 30 e.g. glass or polymer. Conducting nanotubes 32 are made of e.g. carbon nanotubes or graphene or nanotubes of conducting metals such as, gold, silver, chromium, nickel or tungsten. The distance between tips of adjacent nanotubes can be between few tens of nanometers and few hundreds nanometers and determines the threshold power of the optical fuse. The impinging light comes from direction 34.

Figure 6:
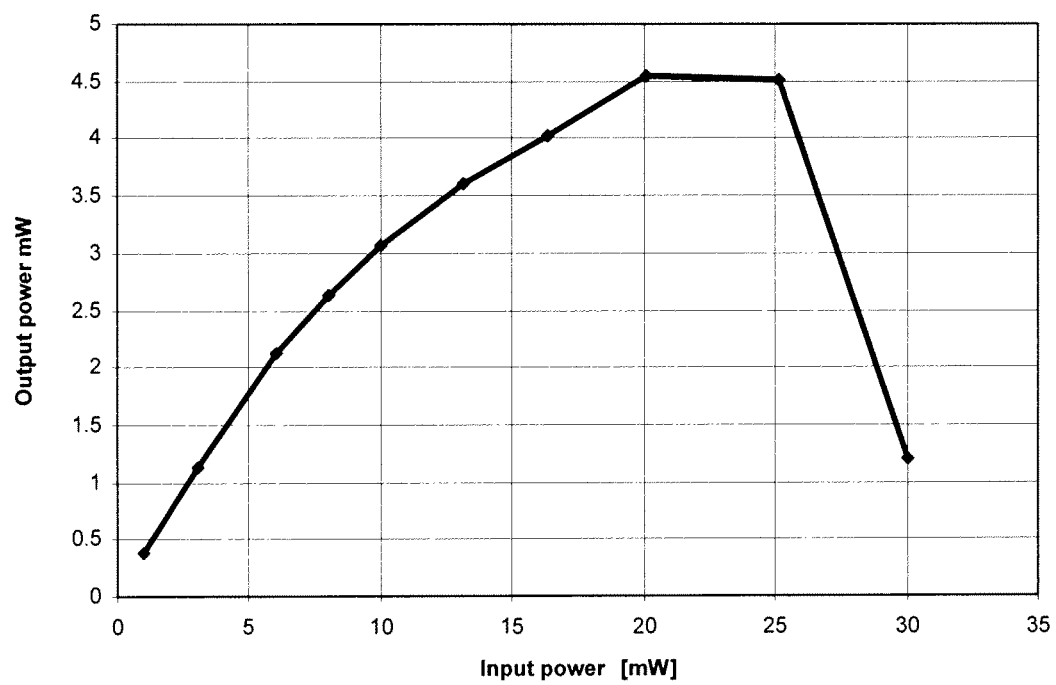
FIG. 6 is an experimental curve of a switch output power versus input power.

FIG. 6 is an experimental curve of a switch output power versus input power. The experimental results showed approximately 25 mW power threshold, where the output power just before damage occurred was approximately 4.5 mW. Also, the output power dropped by approximately to 1 mW when the damage occurred, reducing the output power to approximately 23% of its original power when threshold power was exceeded.

Figure 7:
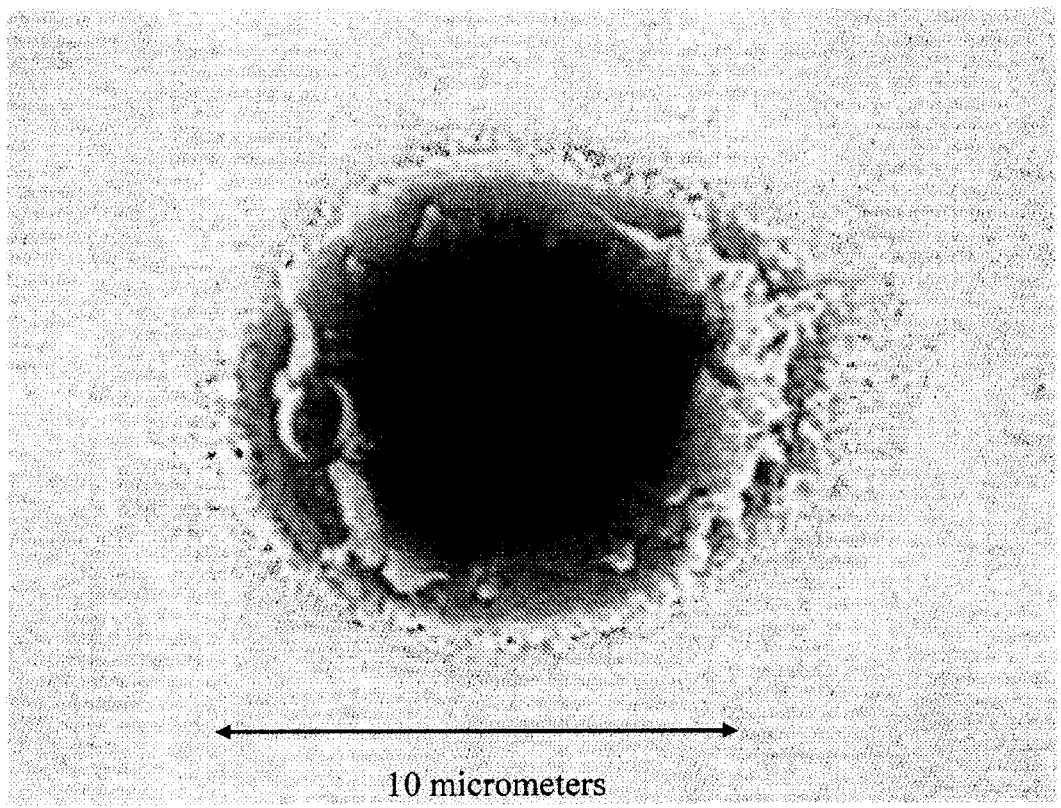
FIG. 7 is an experimental microscopic view of a damaged (opaque) fuse with a crater or craters in the impingement spot.

FIG. 7 is an experimental microscopic view of a damaged (opaque) switch with a crater or craters in the impingement spot. This is an experimental microscopic view of a damaged (opaque) switch where a crater is seen, covering the area (where optical ray is propagating).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

The invention claimed is:

1. An optical fuse or energy-switching-off device, comprising
an optical waveguide having an input section and an output section, the two sections forming a pair of opposed surfaces extending transversely through the axes of said waveguide sections, and
a substantially transparent material disposed between said opposed surfaces and comprising a non-touching, electrically conductive nanotubes web or graphene pieces web immersed in dielectric material, where the nanotubes are not in electrical contact with each other or the graphene pieces are not in electrical contact with each other,
said substantially transparent material forming a plasma when exposed to optical signals propagating within said optical waveguide with an optical power level above a predetermined threshold, said plasma damaging said opposed surfaces sufficiently to render said surfaces substantially opaque to light propagating within said input section of said optical waveguide so as to prevent the transmission of such light.

2. The optical fuse or energy-switching-off device of claim 1, which switches off at said predetermined threshold.

3. The optical fuse or energy-switching-off device of claim 1, which includes a thin, substantially transparent coating of an anti-reflective material on at least one surface of said substantially transparent material.

4. The optical fuse or energy-switching-off device of claim 1, which includes a thin, substantially transparent coating of an anti-reflective material on both surfaces of said substantially transparent material.

5. The optical fuse or energy-switching-off device of claim 1, wherein said electrically conductive nanotubes web or graphene pieces web includes at least one material selected from the group consisting of conducting metals and carbon.

6. The optical fuse or energy-switching-off device of claim 1, wherein said waveguide is an optical fiber.

7. The optical fuse or energy-switching device of claim 1, which includes a pair of connectors each of which is attached to one of said input and output waveguide sections, each connector including a ferrule receiving a portion of said input or output waveguide section, and an aligning sleeve surrounding said ferrules for aligning said opposed surfaces with each other.

8. The optical fuse or energy-switching device of claim 1, wherein said input and output waveguide sections are attached to each other by a mechanical splicing section that includes an aligning sleeve or capillary surrounding said waveguide sections for aligning said opposed surfaces with each other.

9. The optical fuse or energy-switching device of claim 1, wherein said fuse is responsive to a wide range of wavelengths.

10. The optical fuse or energy-switching device of claim 1, wherein said opposed surfaces are not perpendicular to said optical path of said waveguide so as to prevent back reflections.

11. The optical fuse or energy-switching device of claim 1, which includes connectors attached to said input and output sections of said waveguide.

12. The optical fuse or energy switch off of claim 1, for use in an optical system having an input port and an output port and an air space in between, where the optical fuse is placed.

13. A method of preventing the transmission of light within an optical waveguide when optical signals are propagated through the waveguide with an optical power level above a predetermined threshold, the method comprising propagating said optical signals through a layer of a substantially transparent material disposed between a pair of opposed surfaces formed by input and output sections of said optical waveguide and comprising an electrically conductive nanotubes web or graphene pieces web immersed in dielectric material, where the nanotubes or graphene pieces are not in electrical contact with each other, to form a plasma when said nanotubes or graphene pieces are exposed to optical signals having an optical power level above said predetermined threshold, said plasma damaging said opposed surfaces sufficiently to render said surfaces substantially opaque to light propagating within said input section of said optical waveguide so as to prevent the transmission of such light.

14. The method of claim 12, which includes a thin, substantially transparent coating of an anti-reflective material on at least one surface of said layer of a substantially transparent material.

15. The method of claim 12, which includes a thin, substantially transparent coating of an anti-reflective material on both surfaces of said layer of a substantially transparent material.

* * * * *